US007742609B2

(12) United States Patent
Yeakel et al.

(10) Patent No.: US 7,742,609 B2
(45) Date of Patent: Jun. 22, 2010

(54) LIVE PERFORMANCE AUDIO MIXING SYSTEM WITH SIMPLIFIED USER INTERFACE

(75) Inventors: Nathan Yeakel, Sunnyvale, CA (US); Jeffrey Vallier, Sunnyvale, CA (US)

(73) Assignee: Gibson Guitar Corp., Nashville, TN (US)

(*) Notice: Subject to any disclaimer, the term of this patent is extended or adjusted under 35 U.S.C. 154(b) by 0 days.

(21) Appl. No.: 10/406,620

(22) Filed: Apr. 3, 2003

(65) Prior Publication Data

US 2004/0030425 A1 Feb. 12, 2004

Related U.S. Application Data

(60) Provisional application No. 60/370,872, filed on Apr. 8, 2002.

(51) Int. Cl.

| | |
|---|---|
| ***H04B 1/00*** | (2006.01) |
| ***H04B 1/20*** | (2006.01) |
| ***G10H 1/00*** | (2006.01) |
| ***G06F 17/00*** | (2006.01) |
| ***G06F 3/16*** | (2006.01) |

(52) U.S. Cl. ......................... 381/119; 381/118; 700/94; 369/3; 369/4; 715/727; 715/728

(58) Field of Classification Search ................. 381/119, 381/118, 61; 700/94; 369/3, 4; 715/727-728, 715/716; 84/647, 477 R See application file for complete search history.

(56) References Cited

U.S. PATENT DOCUMENTS

| | | | | |
|---|---|---|---|---|
| 4,792,974 A | | 12/1988 | Chace | |
| 5,027,689 A | * | 7/1991 | Fujimori | 84/622 |
| 5,153,829 A | | 10/1992 | Furuya et al. | |
| 5,212,733 A | | 5/1993 | DeVitt et al. | |
| 5,390,295 A | * | 2/1995 | Bates et al. | 715/789 |
| 5,524,060 A | * | 6/1996 | Silfvast et al. | 381/104 |
| 5,526,456 A | | 6/1996 | Heinz | |
| 5,559,301 A | * | 9/1996 | Bryan, Jr. et al. | 84/653 |
| 5,608,807 A | | 3/1997 | Brunelle | |
| 5,739,454 A | * | 4/1998 | Kunimoto | 84/615 |
| 5,740,436 A | | 4/1998 | Davis et al. | |
| 5,778,417 A | | 7/1998 | Kentish et al. | |
| 5,812,688 A | * | 9/1998 | Gibson | 381/119 |
| 6,031,529 A | * | 2/2000 | Migos et al. | 715/783 |
| 6,067,072 A | | 5/2000 | Fujishita et al. | |
| 6,118,883 A | | 9/2000 | Rocha | |

(Continued)

OTHER PUBLICATIONS

Website Publication of innovason.com dated Jan. 30, 2003.

*Primary Examiner*—Vivian Chin
*Assistant Examiner*—Douglas Suthers
(74) *Attorney, Agent, or Firm*—Bates & Bates, LLC

(57) ABSTRACT

A digital audio mixing system for live performance venues includes a software user interface and system host PC with an internal digital signal processor to perform digital mixing functions. The system includes a console having an array of multiple touch screen displays with corresponding fader board (tactile) control surfaces operatively connected to the host PC, and an audio patch bay unit. One or more stage boxes are linked to each other and to the system host PC by wired or wireless connections. The user interface includes multiple functional views and configuration presets, displayed in setup and real time modes, to allow the user to operate the system in a user friendly and simplified environment.

16 Claims, 5 Drawing Sheets

U.S. PATENT DOCUMENTS

| | | | |
|---|---|---|---|
| 6,140,565 | A | 10/2000 | Yamauchi et al. |
| 6,169,540 | B1 | 1/2001 | Rosenberg et al. |
| 6,281,420 | B1 | 8/2001 | Suzuki et al. |
| 6,353,169 | B1 | 3/2002 | Juszkiewicz et al. |
| 6,359,632 | B1 | 3/2002 | Eastty et al. |
| 6,490,359 | B1 | 12/2002 | Gibson |

* cited by examiner

LIVE PERFORMANCE AUDIO MIXING SYSTEM WITH SIMPLIFIED USER INTERFACE

This application claims benefit of co-pending U.S. Patent Provisional Patent Application Serial No. 60/370,872, filed Apr. 8, 2002, entitled "Live Performance Audio Mixing System with Simplified User Interface", the disclosure of which is hereby incorporated by reference.

BACKGROUND OF THE INVENTION

The present invention relates to audio mixing systems. More particularly, the present invention pertains to audio mixing consoles and mixing systems for use in live performance applications.

Audio mixing consoles are used to control and adjust the audio characteristics and sound mix of audio signals generated by musical instruments, microphones, and like, as perceived by listeners at live audio performances. In recent years, analog mixing consoles (sometimes referred to simply as "mixers") used in live performance applications have been supplanted by digital mixers. However, one of the single biggest flaws with conventional digital mixers is that their user interfaces resemble their older analog predecessors. For example, analog mixers use large arrays of mechanical and electromechanical knobs and faders to allow the console operators to individually adjust the audio characteristics associated with multiple audio sources and channels. Such arrays are simply not necessary for a digital mixing product but their use has not been entirely abandoned. With conventional digital mixer user interfaces, an experienced audio professional is required to page through multiple layers of on-screen menus to locate the desired feature on the mixer. This experience can create even more frustration than operating a product containing dedicated adjustment hardware. In addition, conventional digital mixer interfaces are confusing and not intuitive such that to operate them efficiently one must have extensive training in interpreting the displayed menus.

As an example of the inefficiencies caused by extensive menu layering and confusing digital mixer nomenclature, a sound engineer at a live performance venue may notice that an on stage guitar monitor has excessive audible "boom" on the bass drum and that the vocal is buried in the audio mix. Using a conventional mixing system and user interface, the sound engineer has to understand and recall which sub-mix the guitar player is on (assuming the guitar player has the luxury of his own sub-mix). Further, the engineer has to recall from memory which mixer input is associated the bass drum. The engineer then has to find the low frequency EQ knob and turn it down, assuming this is possible without affecting the overall house mix. Also, the sound engineer has to remember where the vocals come in, how they are mixed into the sub-mix, and then turn them up but not so much as to cause feedback.

What is needed, then, is a digital audio mixing system for use in live performance applications that provides a more efficient and understandable user interface.

SUMMARY OF THE INVENTION

The audio mixing system of the present invention provides an elegant answer to the need for an efficient and user-friendly digital mixer and user interface for controlling audio associated with a live amplified performance. It provides a cost-effective solution to a problem mixing console designers have attempted to solve for years. The heart of the system is a powerful interface providing the most powerful digital mixer features controlled by a simple to use software front end.

In accordance with one embodiment of the invention, a system in accordance with the invention will include a software user interface, system host PC running on a WINDOWS-based operating system and with an internal digital signal processor (DSP) card to perform digital mixing functions. In accordance with another aspect of the invention, the system includes a system console having an array of multiple LCD touch screen displays and a fader board (tactile) control surface operatively connected to the host PC, and an audio patch bay unit. In a further embodiment of the system, one or more stage boxes are linked to each other and to the system host PC by wired or wireless connections. Each stage box and studio box contains a multi-channel analog audio interface, analog-to-digital converters, and a wired or wireless digital links to each other and to the system host PC. The stage boxes and studio boxes are functionally the same as the system fader board control surface and are used as interfaces to stage instruments, speakers, microphones, and the like (sometimes collectively referred to as stage elements).

The system provides an improved control interface by visually and functionally (in multiple functional views) abstracting the channel strips found in prior art mixing consoles. Accordingly, changing a variable in a mix is as simple as selecting the stage element audio source (instrument, microphone, or speaker) that the sound engineer wants to change, and then selecting the audio parameter associated with that stage element that needs adjustment. For example, using the example summarized above for conventional systems, the same problem can be handled by a sound engineer at a system console as follows: The engineer taps the icon of the guitar player's monitor speakers on the touch screen. He then selects "Select Bass Drum Mix List" and taps "Too Boomy". Finally, the engineer selects "Vocal1" from the Mix List and taps "Buried". This causes the software in the mixing system to implement the adjustments electronically, without the engineer having to scroll or page through layers of cryptic menus.

DESCRIPTION OF THE PREFERRED EMBODIMENTS

Figure 1:
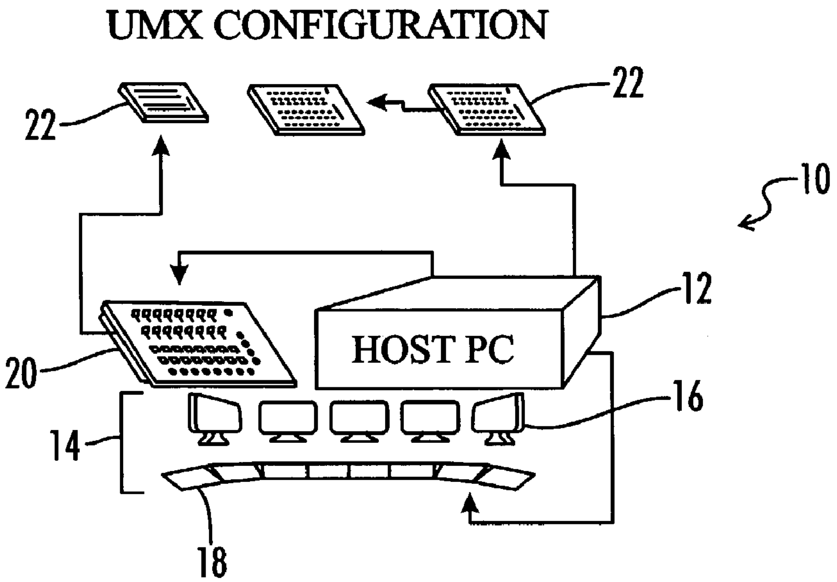
FIG. 1 is a block diagram of a typical arrangement of system components in accordance with the system of the invention.

FIG. 1 is a block diagram of a typical arrangement of components in the audio mixing system of the invention. The system 10 is controlled by a host PC (personal computer) 12.

The host PC 12 is equipped with an internal PCI-based DSP (digital signal processor) card (not shown) where the actual mixing functions are performed. The system 10 further includes a system console 14 comprising a horizontal array of multiple LCD touch screen displays 16 combined with corresponding fader board tactile control surfaces 18. The components of console 14 are electronically coupled to the host PC 12 so as to send mixing control signals to the host PC 12. The mixing control signals are used by the DSP to vary audio parameters associated with the various stage elements (audio source components and audio destination components) connected to the system 10. The host PC 12 is also operatively connected to a console patch bay unit 20. The patch bay unit 20 has multiple inputs to receive audio signals from a plurality of different source audio components and multiple outputs to transmit audio signals to different audio destination components. Preferably, the host PC uses a WINDOWS-based operating system and includes software functional to implement the novel user interface described below.

The stage portion of the system 10 will include one or more stage boxes 22 which are functionally equivalent to the console patch bay unit 20. In a preferred embodiment of the system 10, the system components are interconnected using a universal digital media communications link (hereinafter referred to as a "universal digital audio link") such as that defined in the system and protocol introduced by Gibson Guitar Corporation and disclosed in U.S. Pat. No. 6,353,169 for a "Universal Audio Communications and Control System and Method", the disclosure of which is fully incorporated herein by reference. Accordingly, the system 10 will include: a 64×32 channel mixer with full metering on all inputs and outputs; 64 compressors; 64 parametric equalizer ("EQ's"); plug-in insert effects; real-time total live-in to live-out latency of <3 ms with a single board configuration; and streaming audio to/from a hard disk on host PC 12.

Figure 2:
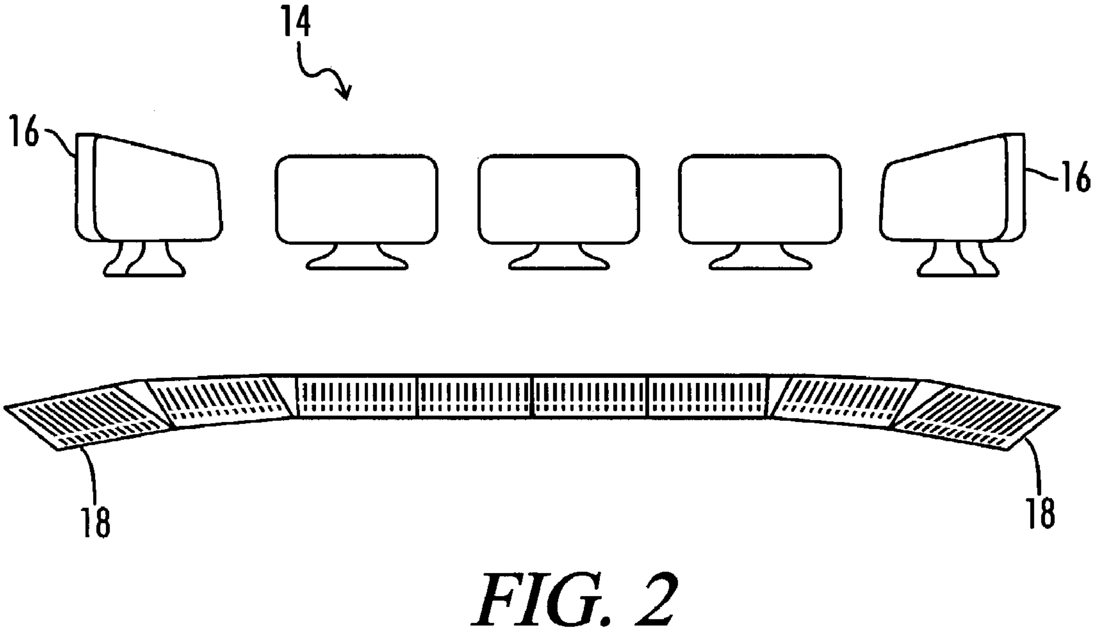
FIG. 2 is front view of the touch screen array and fader board control surface portions of the system of FIG. 1.

As shown in more detail in FIG. 2, the system console 14 has up to six touch-sensitive LCD screen displays 16 positioned for easy viewing in a horizontal array and a combination of multiple fader board tactile control surfaces 18. The graphical user interface of the invention spans across all screens on displays 16. Depending on the function being performed by the system, not all displays may be used at the same time or different displays 16 may be presenting different functional parts or "views" of the user interface.

Positioned below, or otherwise visually and operatively associated with, each display 16 is a fader board tactile control surface 18 containing an array of motorized faders that reflect information shown on the displays 16. The individual faders electromechanically "snap to" the current settings reflected on the corresponding display 16. Manipulating the "real" faders on control surfaces 18 and touching the virtual controls on touch screen displays 16 causes console 14 to send mixing control signals to the host PC 12. The host PC and internal DSP use these mixing control signals to electronically interact, through patch bay unit 20, with the stage elements, i.e., the audio source and destination components, thereby affecting the "mix" or perceived sound coming from the audio components on stage (stage elements). The stage boxes 22 can provide operational connections to the stage elements as needed.

The system 10 of the invention can support 64 simultaneous inputs and 32 simultaneous outputs. Each output can have a custom mix of any or all of the inputs. Additionally, there may be "soft" inputs. A soft input can be an auxiliary return or track from the hard drive on host PC 12.

The host PC 12 and internal DSP are provided with software, including device drivers and Application Program Interface (API) modules to seamlessly integrate all needed mixing, recording, and DSP functions into the system 10. The actual writing of the software to implement these functions is conventional, as is the programming necessary to implement the novel user interface described herein.

The stage boxes 22 (and patch bay unit 20) are each a 16-channel in, 16-channel out, professional quality analog interface for the system 10. In addition to being able to function in a stand-alone mode, the stage box 22 uses a universal digital audio link to send audio up to 100 meters between units without signal loss. The stage box 22 includes advanced preamplifiers (not shown) that operate over a gain range of −60 dB to +15 dB. The analog trim can be remotely controlled via a universal digital audio link control link.

In addition to analog performance, the stage boxes 22 include analog-to-digital (A/D) converters that are capable of up to 24 bit, 96 kHz samples. Phantom power and hard pad can also be controlled remotely using a universal digital audio link. The system 10 can also be adapted for use with SPDIF and AES/EBU, and MIDI protocols and interfaces.

The system user interface is presented to a system user primarily as a series or combination of graphical interfaces presented on one or more touch screen displays 16. The user interface includes multiple functional "views" presented to the user in two modes—setup and real-time—including initial setup windows and dialogs, and real time operational interfaces, referred to herein as "stage view", "virtual console view", "mixer view", and "cute view". In addition, the user interface can optionally include a "drum editor view" for configuring an on-stage drum set.

First-time Setup

The setup mode of system 10 includes a setup process in which system input and output connections are made in the DSP architecture. This greatly simplifies the process of making connections and configuring the system DSP mixer. The result of this setup process will be a table of inputs and outputs with specific properties. User "friendly" names are assigned by the system user to each input, representing different stage elements. The table below reflects one example of a "virtual patch bay" table of inputs, friendly names, and input properties that is developed during system setup.

| INPUTS | TYPE | PREAMP (Db) | PHANTOM | INPUT PORT | COMP | EQ PRESET | OTHER PLUGIN |
|---|---|---|---|---|---|---|---|
| LEAD VOX | XLR | 4 | | 1A01 | FOLLOWING | LDVOX | AT, NT, SS |
| VOX2 | XLR | 2 | | 1A03 | FOLLOWING | BKVOX | |
| VOX3 | XLR | 2 | | 1A02 | SIMPLE | BKVOX | |
| GUITAR 1 CAB | XLR | −12 | | 1A06 | LIMITER | COMBO | |
| GUITAR 2 CAB | XLR | −22 | | 1A07 | LIMITER | CAB | |
| GUITAR 2 DI | ¼" | −6 | | 1A08 | LIMITER | NONE | CRP |

-continued

| INPUTS | TYPE | PREAMP (Db) | PHANTOM | INPUT PORT | COMP | EQ PRESET | OTHER PLUGIN |
|---|---|---|---|---|---|---|---|
| BASS DI | XLR | −4 | | | NONE | NONE | BS |
| DRUM INPUTS | | | | | | | |
| HATS | XLR | −18 | YES | 1B03 | NONE | HP | EXP |
| SNARE | XLR | −28 | | 1B13 | LIMITER | HP | |
| KICK | XLR | −30 | | 1B04 | LIMITER | LP-KICK | |
| TOM1 | XLR | 11 | | 1B05 | LIMITER | NONE | |
| TOM2 | XLR | −14 | | 1B06 | LIMITER | LP | |
| TOM3 | XLR | −15 | | 1B09 | LIMITER | LP | |
| OH1 | XLR | −6 | YES | 1B01 | CYM | HP | |
| OH2 | XLR | −6 | YES | 1B02 | CYM | HP | |
| DRUMMER VOX | XLR | 1 | | 1B12 | SIMPLE | BKVOX | |

The user interface presented during system setup is similar but not identical to a conventional "wizard" type setup window so as to provide a familiar visual environment to the system user. A series of pop-up menus allows the user to configure connections in the patch bay unit 20.

Figure 5:
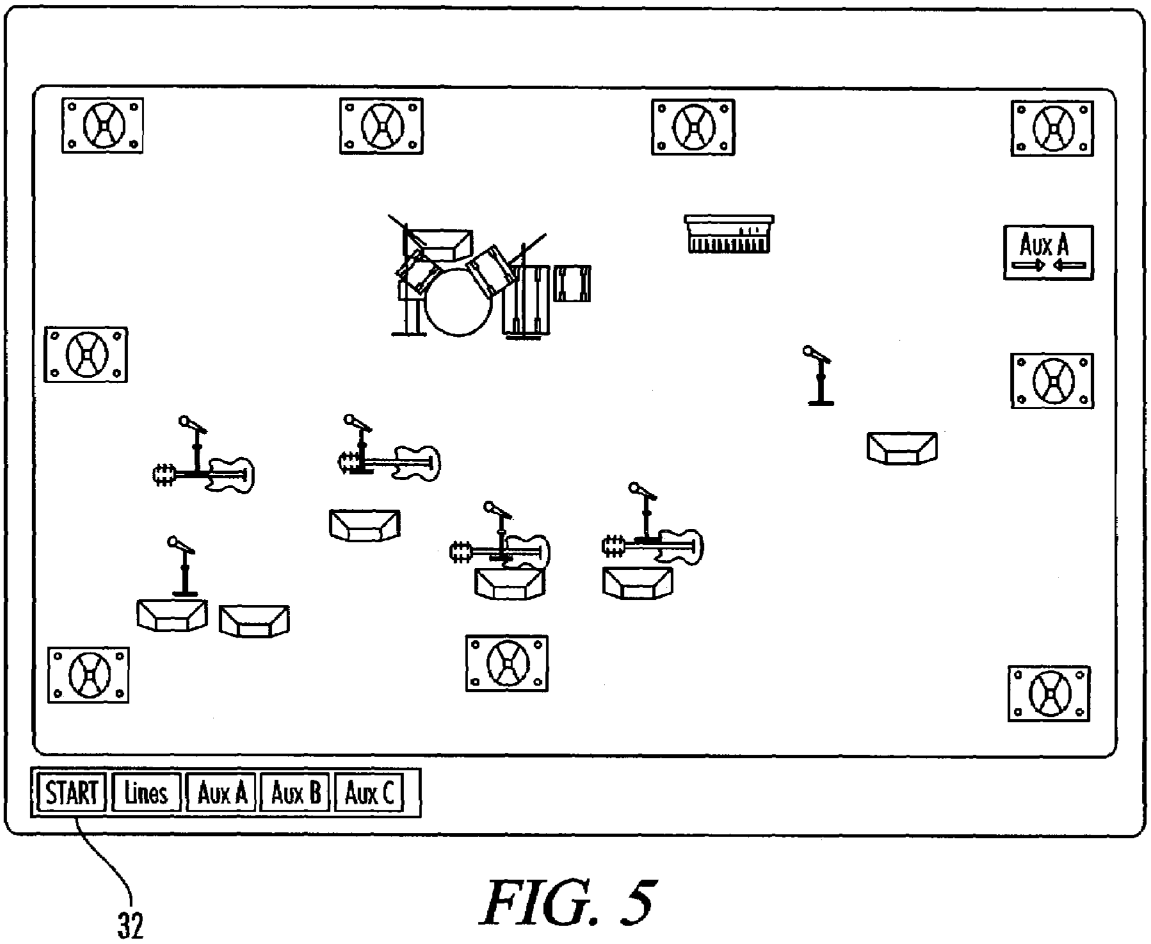
FIG. 5 is a front view of a system touch screen display showing the stage view portion of the user interface as seen during system setup and/or after appropriate stage elements have been selected and arranged during system setup.

FIG. 5 shows one example of a "stage view" portion of the user interface generated by the system 10 on a touch screen display 16. The icons on the stage view, as shown in FIG. 5, visually correspond to different musical instruments and other stage components used on stage, such as guitars, drums, microphones, and speakers. In a preferred embodiment of the user interface of the system 10, a number of different predefined stage element icons are stored in the system software, along with user definable and selectable icons. The stage view should reflect the changes made in the system setup window. Adjusting the shape and appearance of the stage in the touch screen display 16 will help add to the user experience.

The first set of system setup presets will toggle through basic stage setups. The system software is configured to generate and store input and output assignments as part of standard system stage configuration "presets." Sample system setups and presets include "club", "amphitheatre", "church", "lecture hall", "multi-room" and "custom" as follows:

Club—This preset is defined by the basic configuration with the default setup being:

5 piece drum set with 2 overhead speakers and 1 monitor speaker
3 other musicians
3 vocal microphones
2 instrument microphones
3 monitor speakers
1 D.I.
2-channel public address amplifier Amphitheatre—This preset is the same as Club, but with one additional musician, microphone, and monitor and with a larger stage.

Church
5 vocal microphones
1 instrument microphone
3 D.I.
3 monitor speakers
2-channel public address amplifier
reverb Lecture Hall
2 vocal microphones
1 monitor speaker
2-channel public address amplifier Multi-Room:—The multi-room stage view interface includes multiple visual boxes representing different rooms.

Figure 3:
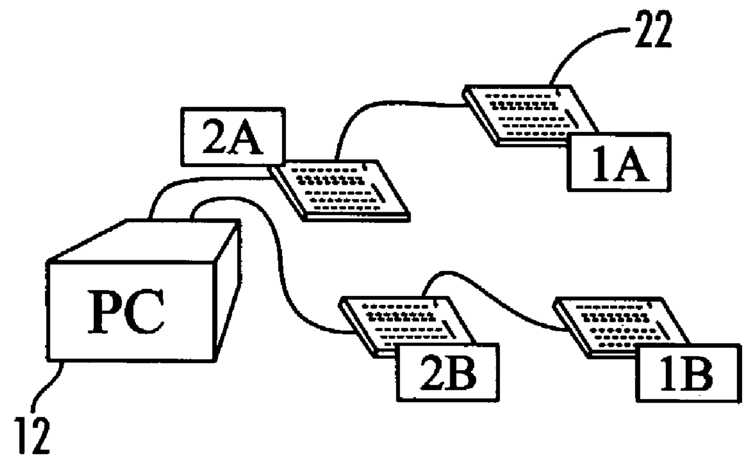
FIG. 3 is a block diagram showing a typical arrangement of system stage boxes connected to the system host PC.

1 stage box in each room
3 vocal microphones per room
2 monitor speaker per room The system 10 can also be used to define custom stage setups without a default configuration. If the DSP card selected for use with host PC 12 includes software that will automatically query the mixer inputs and outputs, then the system can be programmed to configure itself. Otherwise, or in addition the system 10 will generate a custom setup menu on a display 16. FIG. 3 illustrates a typical arrangement of system stage boxes 22 (labeled 1A, 1B, 2A, and 2B) connected to the system host PC12. Accordingly, the setup menu can include the following options for selection by the user:

1 stage box (1A)
2 stage boxes (1A, 2A)
2 stage boxes (1A, 1B)
2 stage boxes (1B, 2B)
3 stage boxes (1A, 2A, 1B)
3 stage boxes (1A, 1B, 2B)
4 stage boxes (1A, 2A, 1B, 2B)

If there are two stage boxes 22 on a port, the stage box 22 that is farthest from the host PC 12 is called unit 1, and the one located between the host PC 12 and stage box unit 1 is referred as unit 2.

Show Setup

During system setup, the default settings are modified and initial input labels are assigned and placed. The user interface includes two types of "show" setups: Venue and Performance. The difference between Venue type and Performance type is that Venue type is designed to be setup once while a Performance setup is changed before each show. Also, custom configurations can be stored in this environment.

The following Venue and Performance types can be setup:

Band—This can be broken down to a group of presets, for example:

4 piece band
5 piece band

Theater—This is a setup for a play or similar presentation, and should include wireless microphone rigs, PZM microphones, and optional Pit Orchestra as stage elements.

Service

A church venue can be defined as a preset without having to be overly specific. Stage element inputs can include a wireless microphone, speakers 1 and 2, chorus and a several keyboard inputs.

Drums

Figure 4:
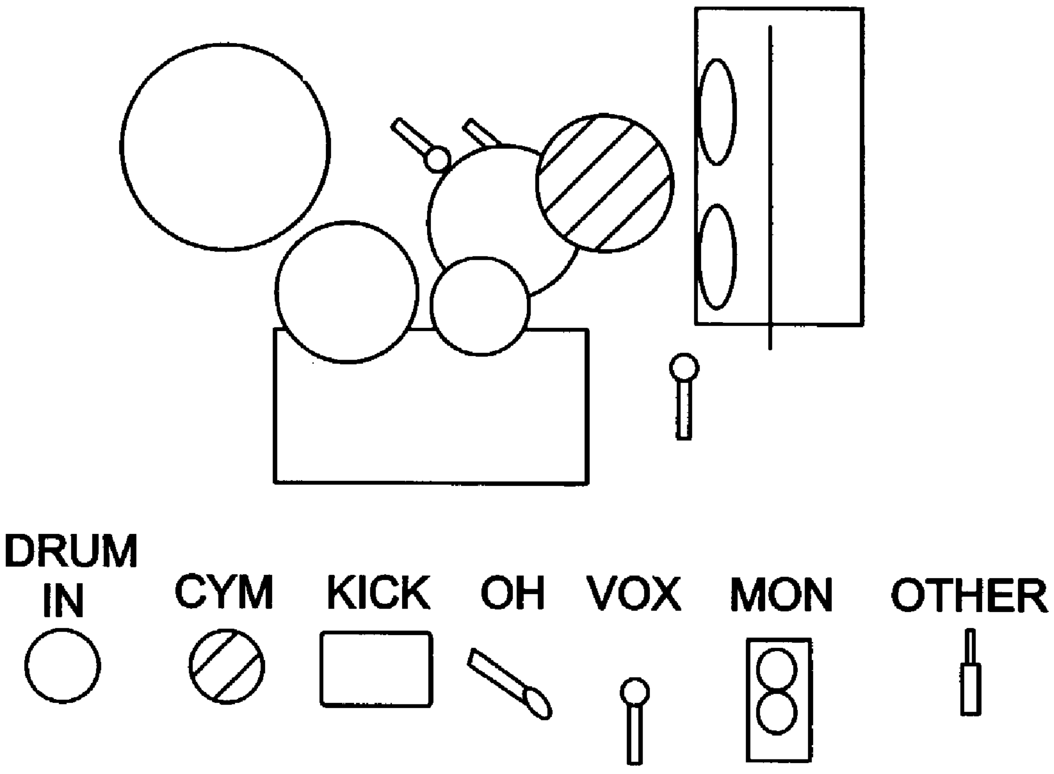
FIG. 4 is a view of a portion of the system touch screen display when using the "drum editor view" portion of the system user interface.

Another novel feature of the system user interface and software is the drum editor. The drum editor is a hierarchical part of the information displayed on touch screen display 16. Because drums require many different configurations and inputs, the drum editor is loaded as a simple alternative to labeling generic inputs on individual drums. The default drum configuration is a 5 piece drum set. An example of a drum editor user interface display is shown in FIG. 4. Note that the interface includes overhead visual representations of each drum set piece or component with an array of separate labeled icons corresponding to each component.

The overhead drum set can be arranged to suit the type of set that is being used. Often a microphone is used to amplify several cymbals or drums. In the drum editor, only drums and cymbals with their own microphone are provided with a specific icon. Microphones used for multiple inputs use the Overhead (OH) icon.

Bass drum, tom-tom drum, snare drum, hats and OH each have different audio gains and equalization settings. Each icon should have displayed the gain and EQ associated with it.

Once the basic configuration of the stage is established, the user can see the selections made reflected on the stage view portion of the user interface, as shown in FIG. 5. At this point, the user can use can manipulate the mouse and cursor to drag and drop the drums, monitors and inputs to positions that visually reflect the layout of the actual stage.

System Software and User Interface Definition

As indicated above, the system 10 supports two modes: setup and real time. The setup mode requires use of only one of the touch screen displays 16 and a conventional mouse. The setup screen occupies all of one screen in a display 16. A standard menu bar is displayed at the top of the screen. The setup mode user interface is functionality organized by the following selections in the menu bar:

File

New—(Setup Wizard). The New option resets the configuration and allows a new configuration to be specified using the Setup Wizard. The Setup Wizard includes many elements.

Load. The Load option allows a user to select a saved configuration, using the common WINDOWS file load dialog. If the user does not cancel the operation, the current configuration is reset, and the selected configuration is loaded from the file.

Save. The Save option saves the current configuration using the current file name. A current file name is set using "Load", or "Save as". If there is not a current file name then this option is disabled.

Save As. The Save option prompts the user for a filename (using the common WINDOWS file save dialog), and saves the current configuration.

Port Listing. The Port Listing option lists the system configuration. The format is a list optionally sorted by port, source name, or destination name. The listing can be saved to a text file, or sent to a printer, if one is attached to the system.

Start Config. The Start Config option switches the system mode from Setup to Real time.

Exit. This exits the system user interface and reboots the machine on non-test systems.

Edit

Options. This option allows global configuration options to be edited using the "Configuration Dialog" which is documented in the section "Configuration Dialog".

Add Source. This option allows a new source to be added to the current configuration. Parameters for the new source are obtained using the "Source Dialog" which is documented in the section "Source Dialog".

Add Dest. This option allows a new destination to be added to the current configuration. Parameters for the new destination are obtained using the "Destination Dialog" which is documented in the section "Destination Dialog".

Add Aux Bus. This option allows a new aux bus to be added to the current configuration. The system only supports three aux buses. This option is disabled if all three buses have already been added. Parameters for the new aux bus are obtained using the "Aux bus Dialog" which is documented in the section "Aux Bus Dialog".

Delete Object. This option deletes the currently selected object. See the topic "Cute View" for a definition of the currently selected Object.

Display

Calibrate Display #1. This option invokes the calibration routine for display #1. The calibration routine presents a white window with a black circle and crosshair in the top left corner. The user is prompted to touch the circle exactly. After touching and releasing the circle, it reappears in the top right corner with the same prompt. This is repeated for all four corners. The routine enters a mode where the user can draw on the monitor in order to test the calibration. After testing, the user has the option to recalibrate or set the calibration.

Calibrate Display #2. This option works the same as Calibrate Display #1, except for Display #2.

Calibrate Display #3. This option works the same as Calibrate Display #1, except for Display #3.

Calibrate Display #4. This option works the same as Calibrate Display #1, except for Display #4.

Cute View

"Cute View" refers to a non-conventional view of a system configuration. The conventional view is implemented via "channel strips" as described under the real time section. The Cute View is always visible on one of the displays 16 (display/monitor #1) both in setup mode and in real time mode. (See FIGS. 5, 6 and 7)

Figure 6:
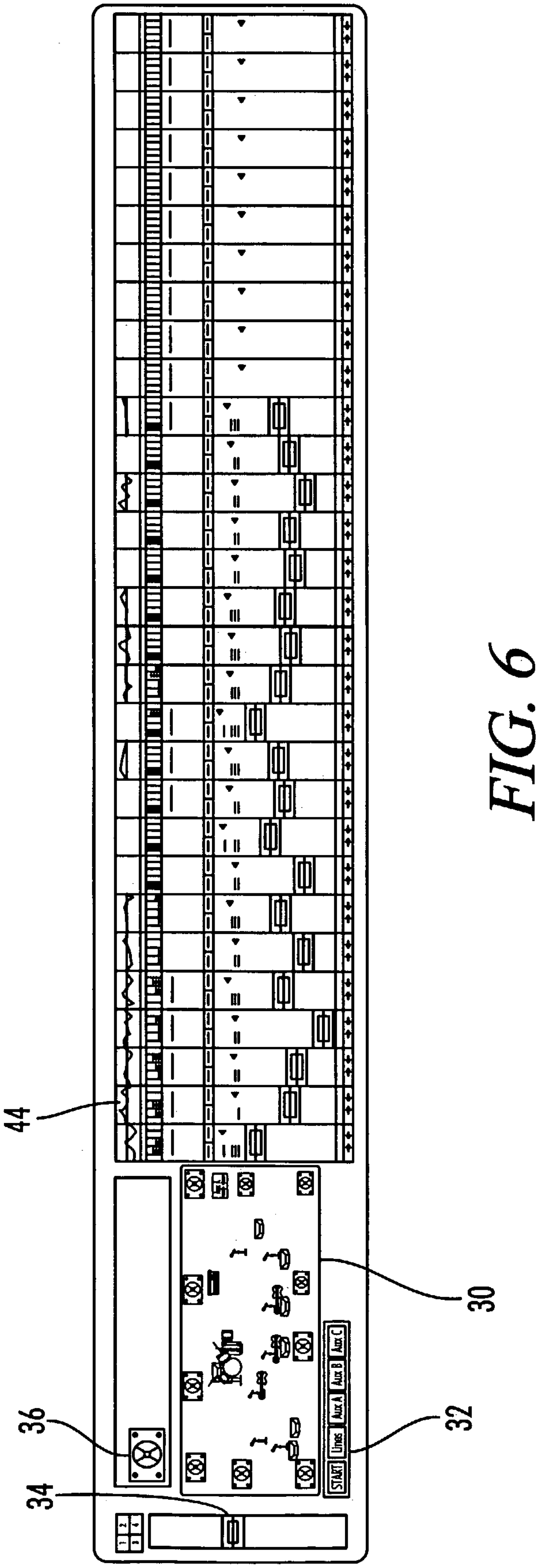
FIG. 6 is a front view of the touch screen display showing the virtual console view portion of the system user interface.
Figure 7:
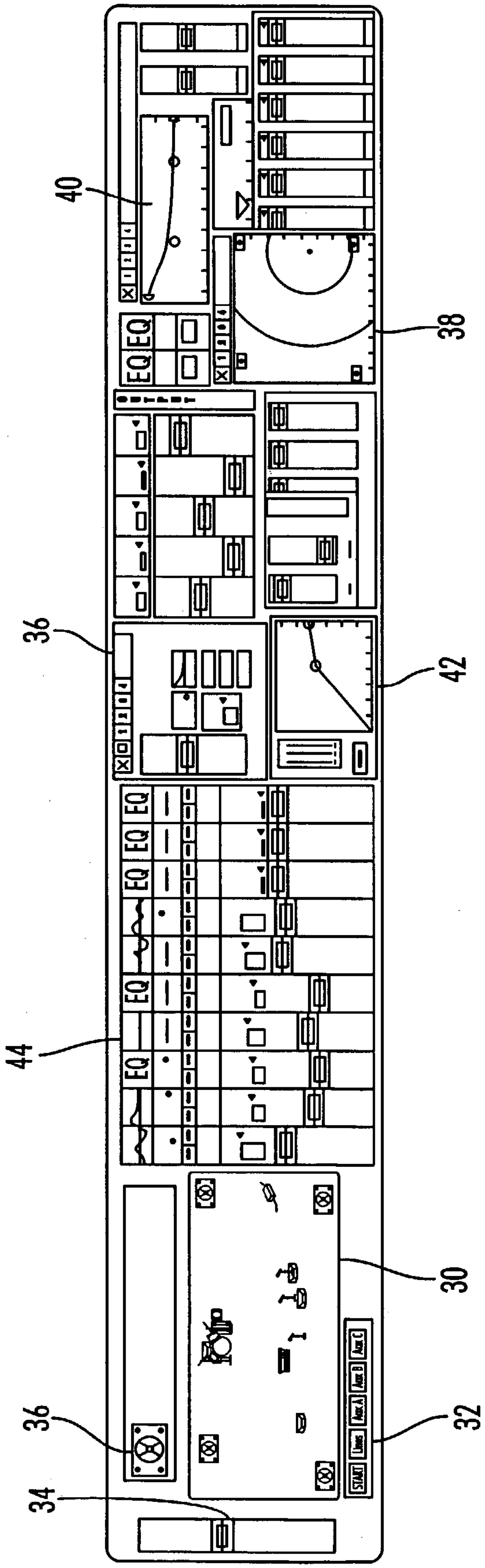
FIG. 7 is a view of the touch screen display showing the mixer functions view portion of the user interface.

FIGS. 6 and 7 show the "virtual console" and "mixer functions" views respectively of the user interface as seen on console 14. The Cute View is presented as a rectangle 30. There are icons inside the rectangle that represent the audio sources and destinations in the stage configuration. There are optional lines that graphically illustrate the connections between the currently selected object and the objects to which it is connected. The currently selected object is highlighted.

Icons in the Cute View can be dragged to any location with persistence. Double-clicking an icon in the Cute View brings up the source edit dialog (if the icon represents an audio source, such as a keyboard), or the destination edit dialog if the icon represents a destination, such as a monitor speaker.

As seen on FIGS. 5, 6, and 7, beneath the Cute View is a tool bar 32. The tool bar 32 contains the following tools:

Start. In setup mode the first tool enters real time mode. Clicking this tool causes it to blink for about 4 seconds. If it is not pressed again before it stops blinking, then real time mode is not entered.

Lines. This tool toggles on or off the lines that graphically illustrate connections in the Cute View.

Aux A. This option brings up the Aux Edit Dialog for aux A.

Aux B. This option brings up the Aux Edit Dialog for aux B.

Aux C. This option brings up the Aux Edit Dialog for aux C.

The Cute View can include text or graphic icons on the display that are programmed to automatically implement certain audio parameter adjustments associated with certain stage elements. For example, if the low frequency response of the lead singer's microphone is an ongoing concern in a particular live performance venue, a particular "adjustment" icon can be pre-configured on the display 16 in the real time mode. Touching an adjustment icon on the screen will immediately cause the console 14 to send mixing control signals to the DSP that will decrease the low frequency response of the designated microphone, without the user having to separately operate an EQ fader. One or more adjustment icons can be pre-configured such that when the adjustment icon is touched, it will cause the system to implement a pre-defined adjustment to a pre-defined audio parameter associated with a pre-defined stage element.

Configuration Dialog

The configuration dialog allows editing of the following parameters:

Text description of the configuration

Notes about the configuration

File name specification for stream-to-disk function

Specification of number of stage boxes attached to system (if this information can not be automatically detected)

Source Edit Dialog

The source edit dialog allows editing of the following parameters pertaining to audio source components as stage elements:

Type specified as text.

Instance name specified as text.

Icon selected from a list box.

Port selected from a list box that contains only unused ports.

Outputs selected from a list box that contains all destinations and aux buses.

Initial trim level set using a fader control. This controls the analog level on the stage box.

Effects selected from a list box that contains all supported effects except EQ.

(EQ is automatically available for all sources).

Destination Edit Dialog

The destination edit dialog allows editing of the following parameters pertaining to destination audio components as stage elements:

Type specified as text.

Instance name specified as text.

Icon selected from a list box.

Port selected from a list box that contains only unused ports.

Inputs selected from a list box that contains all sources and aux buses.

Initial level set using a fader control.

House option selected as a toggle.

Stream to disk option selected as a toggle.

Aux Edit Dialog

The aux edit dialog allows editing of the following parameters:

Inputs selected from a list box that contains all sources.

Outputs selected from a list box that contains all destinations.

Initial trim level set using a fader control.

Effects selected from a list box that contains all supported effects except EQ. (EQ is automatically available for all aux buses).

Real time mode uses from one to four touch-screens 16. All screens can be operated by touch or mouse. Monitor #1 contains the Cute View, the Master Fader, and the Info Bar. All other displays/monitors contain conventional channel strips.

Cute View

In real time mode, the Cute View is available on display 16 #1. Referring to the setup mode definition, the following differences are noted:

The icons flash red to indicate clipping.

The first tool in the toolbar causes the system to switch from real time mode to setup mode.

Double-touching an icon causes a different system behavior. Double touching an icon brings up the source real time window for a source, and the destination real time window for a destination. Touching an aux tool on the toolbar brings up the source real time window (wherein the aux bus is treated exactly like a source).

Master Fader

The master fader 34 is a high-resolution fader that controls scaling of all output levels for all destinations. Beneath the fader is a toggle. Switching the toggle "on" enables stream to disk for all destination objects in which the stream to disk option is enabled.

Info Bar

The info bar 36 displays information about the currently selected object. If no object is selected, all of the objects are paged. The following information is shown:

Instance name and icon

Current level

VU and margin (animated)

Flag to indicate clips detected since change to level

Other misc. information such as connections in order to make the readout appear robust All Real Time Windows Windows that open in real time are non-modal, though normally restricted to only one window that is associated with a particular object. Real-time windows have a toolbar in the top left corner. Some real-time windows have custom tools in the toolbar, but all of them share the following tools:

A close tool that is used for closing the window

Four tools numbered 1-4 which move the window to the same position in the corresponding window Source Real Time Windows Source real time windows have the following components:

Instance name as a text display

Trim level as a fader

VU and margin animated

Pan control icon that brings up the pan control window described below. The icon displays the word "discrete" if the levels have been set discretely using individual faders. If the levels have been set using the pan control window, the positions of all destinations of type house are illustrated as well as the virtual position of the source.

EQ control icon that brings up the EQ control window described below. The EQ icon displays the calculated response of the current settings.

An attached folding window that allows discrete access to output levels.

A tool in the toolbar that opens the discrete level window automatically.

A button associated with all insert effects chained to the associated audio source. Pressing these buttons brings up the edit windows for the effect. In addition to EQ, two effects are "hard coded" into the system, meaning they are supported with custom edit windows. These are the compressor effect which is edited using the compressor control window, and the reverb effect which is edited using the reverb control window. Other DSP effects that may be selected from setup mode are not supported by the user interface. Those effects are edited using any DSP surfaces that they support.

The discrete level window has a fader that controls the mix level for each output to which this source is connected. Each fader is labeled with the instance name of the output, (or aux A, B, or C). Above each fader is an animated VU and margin for the connection. If the output mix levels for the associated source were determined using the Pan Control Window, and any of the faders are moved, the pan control icon reverts to displaying the word "Discrete".

Pan Control Windows

The pan control window 38 contains a grid with meaningless tick spacing. It graphically illustrates the location of all destinations of type "house", as represented in the Cute View. The grid also illustrates a virtual location for the associated audio source that can be dragged to any position by the user. The mix level for the source to any house destination is determined by the distance from the virtual source icon to the associated house destination icon.

Levels that are changed using the pan control window 38 cause the fader controls in the discrete level window to be updated. Moving one of those faders to adjust a level discretely invalidates the settings of the pan control window and closes it.

EQ Control Window

The EQ control window 40 (FIG. 7) contains a grid with vertical ticks indicating gain centered at 0 dB, and horizontal ticks indicating frequency in linear octaves. Points on the grid can be dragged to coarsely set the frequency and gain of the associated parametric EQ band. Two bands are band filters. One of the other bands is low shelf and the final is high shelf. No bands can be moved to the left of low shelf, or to the right of high shelf.

When a point is touched on the grid, a level fader is enabled and associated with that point. Finer gain adjustments can be made with it. When a point is touched on the grid, if it is a band filter, a Q fader is also enabled and associated with that point. Adjustments to the width of the band filter, expressed in relative Q, can be made with that fader. When a point is touched on the grid, a horizontal fader is enabled and associated with that point. Fine adjustments in a two-octave range can be made with that fader. The grid also displays a calculated response curve for the EQ effect.

Compressor Control Window

The compressor control window 42 (FIG. 7) contains the following components:

An animated level display showing in, out, and compression

A bypass button which causes the compressor to be bypassed

A grid, (described below), which can be used to set the threshold and ratio

A folding window containing faders that control the following parameters:

Attack rate

Release rate

Threshold

Ratio

Final Gain

Look ahead

The grid has ticks indicating dB levels for input level (horizontal), and output level (vertical). Two points can be dragged inside the grid. One point controls the threshold and can only be dragged vertically. The other point controls the compression ratio. It can only be dragged vertically, and not below the threshold point. A line is plotted which represents the dynamic response. The line is animated with the VU for the input of the associated source.

Channel Strips

Channel strips 44 (FIGS. 6 and 7) are associated with each input source, including aux buses. A channel strip 44 occupies the full height of the display. The position of the channel strips 44 begins at the left display (16) #2, and occupies up to three of the displays 16. If a house destination (or no destination) is selected in the Cute View, the system activates a channel strip for all sources (house). If a destination that is not of type "house" is selected in the Cute View, then only sources that have output to that destination are active.

A channel strip 44 has the following components:

An EQ control icon that functions as exactly as the EQ control icons documented in the source control window.

A pan control icon that functions as the pan control icons documented in the source control window, except that touching it brings up the source control window rather than the pan control window for the associated source.

A toggle labeled "Aud" (or "Solo") for "audition", which causes all other sources to be muted when in the on state.

A toggle labeled "Mut", for "mute", which causes the associated source to be muted when in the on state.

A text display of all insert effects for the source.

Animated VU and margin display.

Trim fader.

Text display of the name of the corresponding audio source component.

Faders

External faders control the trim levels corresponding to the channel strips, except the first fader. It is reassigned by the system any time a software fader is moved (unless that fader is a trim that is already assigned to a hardware fader). Any fader being controlled by the assignable fader is highlighted.

Simplified User Interface

The following changes can be made to the system user interface in order to simplify it:

EQ: Can be replaced with simple bass, mid, and treble sliders. The advanced user interface option can be selected for full parametric control.

Compression: Controls can be replaced with a type selection, and a single fader labeled "amount". The exact function and range of "amount" may vary depending on the type. Advanced option can be selected for full compressor control.

Browser: can be modified to present simplistic data in a way which is useful to unsophisticated users.

The following additions can be made to the system user interface in order to simplify it:

Input Type Functionality

During setup, the user can select an input type. For example, a microphone could be not only of type "vocal", but even more specific subcategories such as "announcer", "lecturer", or "singer". The types would control some effects. For example, “vocal” type applies a band pass between 80 Hz and 14000 Hz in order to filter 60 Hz hum and hiss.

The “Announcer” type will automatically have an (optional) control that works like a chain compressor. When the microphone input is active, all other levels are brought down.

“Lecturer” type is a solo speaker giving a speech or lecture, and could have some compression useful for making the speech clear.

“Singer” type would apply a tighter band pass, and some default compression useful for vocals.

If all simplification options are implemented, along with aesthetic and labeling changes, the system user interface would then be very simple. Unsophisticated users can rely on the “stage” view. The user would then touch the icon corresponding to the input they want to adjust, and then be presented with a simple panel with labels like “volume”, “bass”, “mid”, “treble”, etc.

Enhanced Setup:

The setup mode already has the potential to be very simple if a large database of predefined objects is created. Users can simply pick objects from a tree of categories. They are added to the stage, and can be dragged to a virtual position.

Optionally, the system 10 can support using a microphone with a known frequency response for calibration. This microphone must be able to send input to the system 10 which is analyzed with a Fast Fourier Transform, using the host PC 12 processor. A sound “sweet spot” is chosen in the venue, and the microphone is placed in that position. Through an interactive process of playing noise through the speakers, analyzing the sampled input (with the microphone’s known response subtracted), the speaker levels can be automatically calibrated, and final EQ could be determined in order to remove resonant frequencies, and flatten the character of the speakers. Other calibrations could be done using this calibration technique, such as virtual positioning of speakers and instruments.

I/O Port Definitions

For all I/O Ports (source or destination), the following parameters can be selected to create the port definition:

I/O TYPE: source or destination

PORT NUMBER: This is virtualized, meaning that it is just a number and it doesn’t matter which DSP module. For example, if there are 32 inputs from 4 DSP DATS, each having 8 inputs, select a port number between 1 and 32.

NAME: A short name is assigned to describe what this port is used for, e.g., a class name like “Mic”.

INSTANCE NAME: This represents the name of this particular port in this setup, such as “Lead Singer”.

ICON: An icon is assigned from the following list:

undefsource,
undefdest,
microphone,
speaker,
monitor,
keybd,
effect,
patchbox,
drumset,
inport,
outport,
kick,
snare,
floortom,
racktom,
cymbal,
guitar POSITION: This locates the component or element on the stage in x, y coordinates. The stage corresponds to coordinate range −1,−1 to +1,+1 (floating).

ROTATION: The system supports rotation in radians internally.

If the port is for a source, the following definitional information is needed:

OUTPUTS: A list of all I/O destinations or auxiliary buses that this source ultimately goes to (ignoring inserts). This is not a port number. Rather, it is a reference to the specific item through whatever means the wizard identifies them.

EFFECTS: Up to three insert effects are selected. The hard coded effects are indicated by number, e.g., 1=compressor, 2=reverb, and 3=EQ.

EFFECT PARAMS: Defaults can be set for the effect parameters. Otherwise, the various effects parameters can be input using a predefined format.

If the port is for a destination, the following definitional information is needed:

INPUTS: A list of all I/O sources or auxiliary buses that this source ultimately goes to (ignoring inserts). This is not the port number. Rather, it is a reference to the specific item through whatever means the wizard identifies them.

HOUSE FLAG: If the flag is set to 1=this is house. This could mean that it is a speaker but not a monitor. If the flag is set to 0=this is some other kind of output. If this flag is set to indicate house, the output appears in the two-dimensional panning screen.

Auxiliary Bus Definitions

NUMBER: 1, 2, or 3.

OUTPUTS: A list of all I/O destination objects that the bus ultimately goes to (ignoring the effects). This is the same as for a source I/O port.

EFFECTS: Up to three insert effects can be defined, just like with sources.

Custom Parameter Definitions

Custom audio parameters can be defined in a variety of ways. For example, a custom parameter may be defined that tightens the EQ and raises volume at the same time. A custom parameter is described as a list of things a parameter changes, with an offset and multiplier for each.

Thus, using the system 10 of this invention, the sound mix at a live performance venue can be setup and then controlled in real time using a digital mixing console with a highly efficient and easy to comprehend and operate user interface. The user is provided with one or more preset stage and venue configurations, with defined audio sources and destinations. The sources and destinations (stage elements) are visually displayed as graphical icons with “friendly” names and icons and are assigned to various mixer inputs and outputs. The icons are moved to different positions on the display to reflect the physical arrangement on the stage. Audio characteristic associated with each stage element (e.g., gain and EQ) are displayed in connection with each icon. To adjust an audio parameter, the icon is touched on the display and then appropriate adjustments are made using virtual console and mixer function views on the system display. Standard adjustments can be selected by simply touching “friendly” names on the display.

Thus, although there have been described particular embodiments of the present invention of a new and useful Live Performance Audio Mixing System with Simplified User Interface, it is not intended that such references be construed as limitations upon the scope of this invention except as set forth in the following claims.

What is claimed is:

1. A digital audio mixing system for real time mixing and adjustment of audio signals during a live performance on a live performance stage, the system comprising:

a. a host computer having a processor configured to perform digital audio mixing functions which controls selected audio parameters including the relative volume levels of audio signals for a plurality of inputs and a plurality of outputs in response to mixing control signals for controlling the selected audio parameters;

b. an audio patch bay unit coupled to the processor, the patch bay unit having a plurality of inputs, the inputs adapted to receive audio signals from a plurality of different live audio source components and a plurality of outputs adapted to transmit audio signals to a plurality of audio destination components wherein the patch bay unit configures the connections between the inputs and the outputs;

c. a system console configured to generate and transmit the mixing control signals to the processor, the system console comprising at least one touch sensitive display and at least one tactile control surface having audio faders;

d. a system user interface, the user interface comprising software which directs the host computer to generate multiple functional views on the display; the multiple functional views including a stage view; and e. the stage view comprising a plurality of different predefined and user selectable icons on the display, each of the icons visually representing different types of the audio source and destination components connected to the system, the icons movable by the user on the display to positions representing actual stage locations on the live performance stage of the stage elements corresponding to the icons, and a plurality of user selectable stage element configuration presets, the presets including a predefined selection and arrangement of audio source and destination components, f. wherein the software configures the system user interface to control the audio patch bay unit so that the user can select multiple ones of the inputs and reconfigure the connections between the selected inputs and one or more of the outputs to define one or more user selected mixes of audio signals from said live audio source components; and g. wherein the software configures the system user interface to receive user input commands in real time during a the live performance to select an audio signal from one or more of said live audio source components by touching or pointing to one or more icons on the stage view representing said one or more live audio source components, and to receive user input commands real time during the live performance to adjust multiple audio parameters, including the relative volume levels, related to the one or more live audio source components by selecting multiple audio parameters of the selected signal and then adjusting the multiple selected parameters.

2. The system of claim 1, the user interface further comprising a setup view, the setup view comprising a virtual patch by table of system inputs and input audio properties associated with each input, each of the inputs having user-assignable user-friendly names, the user-friendly names representing different stage elements assignable by the user to the input.

3. The system of claim 2 wherein the virtual console view includes an array of touch screen faders.

4. The system of claim 3 wherein the touch screen faders are arranged in channel strips having multiple audio channels to visually simulate a non-virtual mixing console.

5. The system of claim 4 wherein the each of the channels in the channel strips includes an EQ control icon, a pan control icon for bringing up a pan control window, a sole mode toggle configured to mute all other system audio sources, a mute toggle configured to mute the audio source corresponding to that channel, a text display of all insert effects for the corresponding audio source, a VU and margin display, a trim fader, and a text display of the name of the corresponding audio source component.

6. The system of claim 4, the user interface further comprising a mixer functions view, the mixer functions view comprising a pan control window and an EQ control window.

7. The system of claim 6 wherein the virtual console view and mixer function view each include a cute view window, the cute view window displaying the icons selected and arranged by the user to represent the types and locations of the audio source and destination components on stage.

8. The system of claim 7, the cute view window further comprising a visual display of audio parameters associated with an audio source represented on the display.

9. The system of claim 3, the user interface further comprising a drum editor view.

10. The system of claim 3, the setup view further comprising user selectable, pre-defined show setup configurations.

11. The system of claim 10, the setup configurations including venue-type configurations and performance-type configurations.

12. The system of claim 1, the user interface comprising selectable between an advanced user interface mode and a simplified user interface mode which reduces the complexity of the advanced user interface mode for an unsophisticated user.

13. The system of claim 1, the stage view further comprising at least one user definable adjustment icon, the adjustment icon programmed to automatically implement pre-defined audio parameter adjustments associated with a pre-defined stage element.

14. The system of claim 1, further comprising at least one stage box linked to the host PC wherein the stage box can configure the connections between a plurality of stage box inputs and a plurality of stage box outputs.

15. The system of claim 14 wherein the host PC, stage box, and stage elements are linked by a universal digital audio link wherein the universal digital audio link interconnects the host PC, the stage box, and the stage elements, on a universal network.

16. A method of digital audio mixing comprising:

a. providing a host computer having a processor that performs digital audio mixing functions which controls selected audio parameters, including the relative volume levels, of audio signals for a plurality of inputs and a plurality of outputs in response to mixing control signals for controlling the selected audio parameters;

b. providing an audio patch bay unit coupled to the processor, the patch bay unit having the plurality of inputs, the inputs adapted to receive audio signals from a plurality of different live audio source components and the plurality of outputs adapted to transmit audio signals to a plurality of audio destination components wherein the patch bay unit configures the connections between the inputs and the outputs in response to mixing control signals for controlling the connections;

c. providing a system console that enerates and transmits the mixing control signals to the processor, the system console, comprising at least one touch sensitive display and at least one tactile control surface having audio faders;

d. providing a system user interface, the user interface comprising software that directs the host computer to generate multiple functional views on the display; the multiple functional views including a stage view and a virtual console view;

e. wherein the stage view comprises a plurality of different pre-defined and user selectable icons on the display, each of the icons visually representing different types of the audio source and destination components connected to the system, the icons movable by the user on the display to positions representing actual stage locations on the live performance stage of the stage elements corresponding to the icons, and a plurality of user selectable stage element configuration presets, the presets including a predefined selection and arrangement of audio source and destination components;

f. controlling the audio patch bay unit and selecting multiple ones of the inputs and reconfiguring the connection between the selected inputs and one or more of the output to define one or more user selected mixes of audio signals from said live audio source components; and g. selecting in real time during the live performance an audio signal from one of said live audio source components by touching or pointing to one or more icons on the stage view representing said one or more live audio source components, and selecting multiple audio parameters, including the relative volume levels, of the selected signal and then adjusting the multiple selected parameters.

* * * * *

US007742609C1

(12) EX PARTE REEXAMINATION CERTIFICATE (9761st)

United States Patent

Yeakel et al.

(10) Number: US 7,742,609 C1
(45) Certificate Issued: Jul. 19, 2013

(54) LIVE PERFORMANCE AUDIO MIXING SYSTEM WITH SIMPLIFIED USER INTERFACE

(75) Inventors: Nathan Yeakel, Sunnyvale, CA (US); Jeffrey Vallier, Sunnyvale, CA (US)

(73) Assignee: Bank of America, N.A., Chicago, IL (US)

Reexamination Request:
No. 90/012,408, Jul. 27, 2012

Reexamination Certificate for:
Patent No.: 7,742,609
Issued: Jun. 22, 2010
Appl. No.: 10/406,620
Filed: Apr. 3, 2003

Related U.S. Application Data

(60) Provisional application No. 60/370,872, filed on Apr. 8, 2002.

(51) Int. Cl.
*H04B 1/00* (2006.01)
*H04B 1/20* (2006.01)
*G10H 1/00* (2006.01)
*G06F 17/00* (2006.01)
*G06F 3/16* (2006.01)

(52) U.S. Cl.
USPC .................. 381/119; 369/3; 369/4; 381/118; 700/94; 715/727; 715/728

(58) Field of Classification Search
None
See application file for complete search history.

(56) References Cited

To view the complete listing of prior art documents cited during the proceeding for Reexamination Control Number 90/012,408, please refer to the USPTO's public Patent Application Information Retrieval (PAIR) system under the Display References tab.

*Primary Examiner* — Jason Proctor

(57) ABSTRACT

A digital audio mixing system for live performance venues includes a software user interface and system host PC with an internal digital signal processor to perform digital mixing functions. The system includes a console having an array of multiple touch screen displays with corresponding fader board (tactile) control surfaces operatively connected to the host PC, and an audio parch hay unit. One or more stage boxes are linked to each other and to the system host PC by wired or wireless connections. The user interface includes multiple functional views and configuration presets, displayed in setup and real time modes, to allow the user to operate the system in a user friendly and simplified environment.

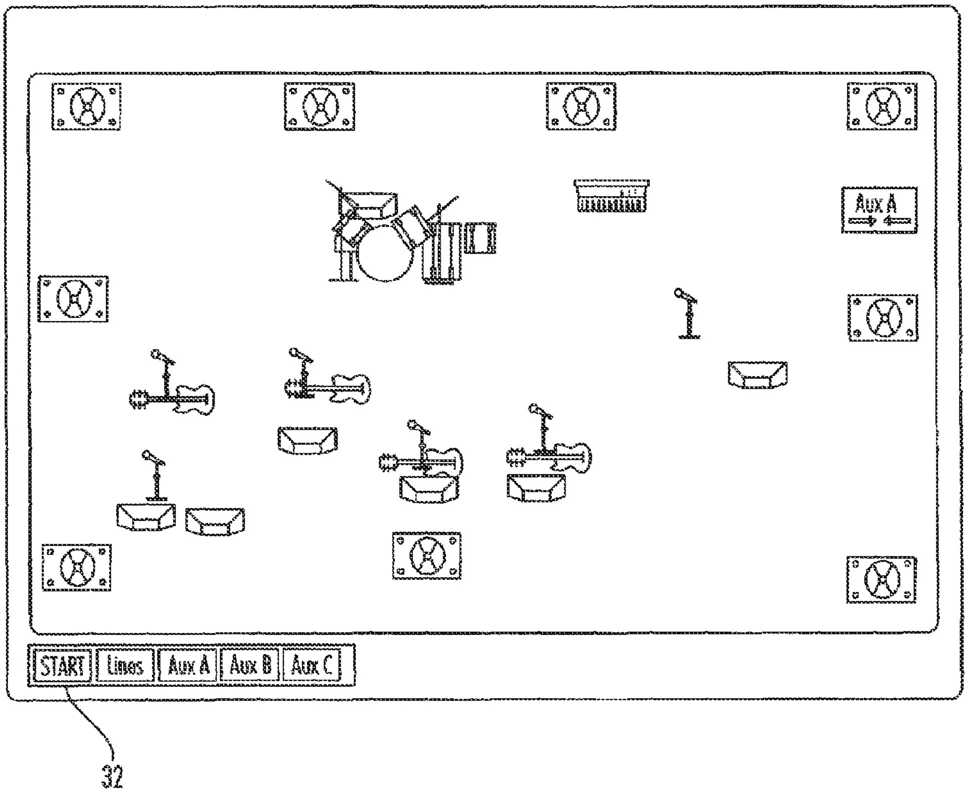

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-3, 9-11, 13 and 16 are determined to be patentable as amended.

Claims 4 and 6, dependent on an amended claim, are determined to be patentable.

Claims 5, 7, 8, 12, 14 and 15 were not reexamined.

1. A digital audio mixing system for real time mixing and adjustment of audio signals during a live performance on a live performance stage, the system comprising:

a. a host computer having a processor configured to perform digital audio mixing functions which controls selected audio parameters including the relative volume levels of audio signals for a plurality of inputs and a plurality of outputs in response to mixing control signals for controlling the selected audio parameters;

b. an audio patch bay unit coupled to the processor, the patch bay unit having a plurality of inputs, the inputs adapted to receive audio signals from a plurality of different live audio source components and a plurality of outputs adapted to transmit audio signals to a plurality of audio destination components wherein the patch bay unit configures the connections between the inputs and the outputs;

c. a system console configured to generate and transmit the mixing control signals to the processor, the system console comprising at least one touch sensitive display and at least one tactile control surface having audio faders;

d. a system user interface, the user interface comprising software which directs the host computer to generate multiple functional views on the display[;], the multiple functional views including a stage view; and e. the stage view comprising a plurality of different predefined and user selectable icons on the display, each of the icons visually representing different types of the audio source and destination components connected to the system, the icons movable by the user on the display to positions representing actual stage locations on the live performance stage of the stage elements corresponding to the icons, and a plurality of user selectable stage element configuration presets, the presets including a predefined selection and arrangement of audio source and destination components, f. wherein the software configures the system user interface to control the audio patch bay unit so that the user can select multiple ones of the inputs and reconfigure the connections between the selected inputs and one or more of the outputs to define one or more user selected mixes of audio signals from said live audio source components; and g. wherein the software configures the system user interface to receive user input commands in real time during [a] the live performance [to select] *by supporting selection of* an audio signal from one or more of said live audio source components [by touching or pointing] *when a user touches* or *points* to [one or more] *an icon of the* icons on the stage view representing said one or more live audio source components, and [to receive user input commands real time during the live performance to adjust]*, in response to the selection, by presenting a source real time window that includes components associated with* multiple audio parameters, including the relative volume levels, related to the [one or more] live audio source [components by selecting] *component associated with the selected icon, and selecting and adjusting the* multiple audio parameters of the selected signal [and then adjusting] *when an associated component of* the [multiple selected parameters] *components is selected and adjusted.*

2. The system of claim 1, the user interface further comprising a setup view, the setup view comprising a virtual patch [by] *bay* table of system inputs and input audio properties associated with each input, each of the inputs having user-assignable user-friendly names, the user-friendly names representing different stage elements assignable by the user to the input.

3. The system of claim [2 wherein the] *1 further comprising a* virtual console view *that* includes an array of touch screen faders.

9. The system of claim [3] *1*, the user interface further comprising a drum editor view*, wherein the drum editor view includes a visual representation of an arrangement of drum set components*.

10. The system of claim [3] *2*, the setup view further comprising user selectable, pre-defined show setup configurations.

11. The system of claim 10, the setup configurations including venu—type configurations *designed to be setup once* and performance-type configurations *designed to be setup before each live performance*.

13. The system of claim 1, the stage view further comprising at least one user definable adjustment icon, the adjustment icon programmed to automatically implement pre-defined audio parameter adjustments associated with a pre-defined stage element *when the adjustment icon is touched*.

16. A method of digital audio mixing comprising:

a. providing a host computer having a processor that performs digital audio mixing functions which controls selected audio parameters, including the relative volume levels, of audio signals for a plurality of inputs and a plurality of outputs in response to mixing control signals for controlling the selected audio parameters;

b. providing an audio patch bay unit coupled to the processor, the patch bay unit having the plurality of inputs, the inputs adapted to receive audio signals from a plurality of different live audio source components and the plurality of outputs adapted to transmit audio signals to a plurality of audio destination components wherein the patch bay unit configures the connections between the inputs and the outputs in response to mixing control signals for controlling the connections;

c. providing a system console that generates and transmits the mixing control signals to the processor, the system console, comprising at least one touch sensitive display and at least one tactile control surface having audio faders;

d. providing a system user interface, the user interface comprising software that directs the host computer to generate multiple functional views on the display[;], the multiple functional views including a stage view and a virtual console view;

e. wherein the stage view comprises a plurality of different pre-defined and user selectable icons on the display, each of the icons visually representing different types of the audio source and destination components connected to the system, the icons movable by the user on the display to positions representing actual stage locations on the live performance stage of the stage elements corresponding to the icons, and a plurality of user selectable stage element configuration presets, the presets including a predefined selection and arrangement of audio source and destination components;

f. controlling the audio patch bay unit and selecting multiple ones of the inputs and reconfiguring the connection between the selected inputs and one or more of the [output] *outputs* to define one or more user selected mixes of audio signals from said live audio source components; and g. selecting in real time during the live performance an audio signal from one of said live audio source components by touching or pointing to one or more icons on the stage view representing said one or more e live audio source components, and, [selecting] *in response to the icon selection, presenting a source real time window that includes components associated with* multiple audio parameters, including the relative volume levels, of the selected signal and then *selecting and* adjusting [the multiple selected parameters] *the multiple audio parameters of the selected signal using the components.*

* * * * *